United States Patent [19]

Pfister

[11] 4,137,473
[45] Jan. 30, 1979

[54] ELECTRICAL DRIVE DEVICE

[75] Inventor: Jean-François Pfister, Sonceboz, Switzerland

[73] Assignee: Societe Industrielle de Sonceboz S.A., Sonceboz, Switzerland

[21] Appl. No.: 833,571

[22] Filed: Sep. 15, 1977

[30] Foreign Application Priority Data

Sep. 21, 1976 [CH] Switzerland ............... 11938/76
Apr. 21, 1977 [DE] Fed. Rep. of Germany ....... 2717969

[51] Int. Cl.² ........................................... H02K 7/11
[52] U.S. Cl. .................................. 310/98; 310/103; 310/162; 310/156
[58] Field of Search ............... 310/92, 98, 103, 105, 310/156, 162–165, 114, 126, 112

[56] References Cited

U.S. PATENT DOCUMENTS

| 2,289,330 | 7/1942 | Fischer et al. | 310/98 |
| 2,603,678 | 7/1952 | Helmer | 310/103 |
| 2,807,734 | 9/1957 | Lehde | 310/103 |
| 3,320,448 | 5/1967 | Turk | 310/98 |
| 3,790,889 | 2/1974 | Mincuzzi | 310/103 X |

Primary Examiner—Donovan F. Duggan
Attorney, Agent, or Firm—Werner W. Kleeman

[57] ABSTRACT

An electrical drive device comprising a stator arrangement of the claw pole type surrounding a stator chamber or compartment and producing therein at least one magnetic field containing at least one rotary field component. There is provided a permanent magnet-rotor arranged in such rotor chamber in such a manner that it rotates in synchronism with such magnetic field and a hysteresis magnetic coupling, the driving part of which is form-lockingly connected with such rotor and the driven part of which is force-lockingly secured to a shaft constituting the power take-off shaft of the drive device. The stator arrangement, the rotor, the driving part of the hysteresis magnetic coupling and the driven part of such coupling are all housed in a common housing.

9 Claims, 6 Drawing Figures

ELECTRICAL DRIVE DEVICE

BACKGROUND OF THE INVENTION

The present invention relates to a new and improved construction of an electrical drive device comprising a stator arrangement of the claw or dog pole type, surrounding a rotor compartment or chamber and generating therein at least one magnetic field having at least a rotary field component.

It is well known in the art that basically there are available three types of electric motors which do not employ collector- and slip rings, and the stator of which is supplied with single-phase or polyphase alternating-current.

The first type is the so-called permanent magnet-synchronous motor, the rotor of which comprises one or a number of permanent magnets. These permanent magnets, especially in the case of small motors, are usually fixedly mounted in a cylindrical rotor and are flush with its smooth outer surface. The stator is then advantageously of the so-called claw pole type, resulting in a particularly simple, inexpensive and small construction. These synchronous motors, can possess quite a high mechanical torque as long as the rotor rotates at the synchronous rotational speed, but however the mechanical torque becomes practically equal to null when a braking moment, which is greater than that capable of being delivered by the motor, reduces the rotational speed of the rotor.

The second type is the so-called hysteresis synchronous motor, the rotor of which is formed of a material possessing hysteresis, i.e. a magnetic material characterized by quite high remanence, but low coercive force and furthermore possesses as high as possible specific resistance. These synchronous motors can deliver a pre-determined mechanical torque and rotate at the synchronous rotational speed as long as the braking moment does not exceed this pre-determined torque. If the braking moment exceeds this torque which is characteristic for the motor, then the rotor begins to rotate less rapidly and can even come to standstill, and the torque delivered by the motor always is equal to the relative pre-determined torque. If the braking torque decreases with the rotational speed, for instance, in the presence of liquid- or gas friction, then the motor begins to rotate at a rotational speed where the braking torque is exactly equal to the characteristic torque of the motor. If the rotor is braked until coming to standstill and the braking torque is converted into a reaction moment, which is automatically equal to the torque of the motor, then the latter always possesses its characteristic value, and the rotor again begins to revolve when the braking action only develops a torque which is less than that delivered by the motor.

Finally, the third type is the so-called induction current-asynchronous motor which comprises a rotor which at least in part is formed of a conductive material. There are distinguished between asynchronous motors of appreciable output, enclosing a magnetic rotor which is equipped with conductor rods in a squirrel cage arrangement and asynchronous motors of lower output which enclose a rotor which is only composed of non-magnetic material of good current-conducting properties, these motors also being designated as eddy current motors.

In accordance with these three motor types, there are also known to the art three types of magnetic or electro-magnetic couplings, wherein the driving or driven part comprises one or a number of permanent magnets which rotate and produce a magnetic rotary field. The other part is always a permanent magnet-, a hysteresis-, or an eddy current-part and is actuated by this rotary field in exactly the same manner as the rotor in a motor of the corresponding type.

These three types of magnetic couplings have been particularly described and examined in an article authored by Paul Gernhardt appearing in "DEW-Technische Berichte", 2. Band, 1962, Heft No. 4, pages 153–159. This article contains very detailed information which need not here be repeated.

Of these three motor types the hysteresis motor possesses properties which are particularly interesting from a number of different standpoints. There is however one point with regard to which it possesses an appreciable drawback in relation to motors equipped with permanent magnets. The hysteresis motor only operates really satisfactorily if the magnetic field to which the rotor is exposed possesses a true uniform rotary field, i.e. a rotary field like that in a magnetic coupling where the field is generated by a magnet which rotates. If there is available, for instance, a three-phase stator arrangement, then it is easy to produce a true magnetic rotary field. However, if there is only available a single-phase alternating-current power supply, then oftentimes it is desirable to be able to be satisfied with a simple alternating field or at best an elliptical field which consists of a primary magnetic field and an appreciably weaker magnetic field which is phase-shifted by 90°. In this case, the hysteresis motor produces really unsatisfactory results, since in a simple alternating field, rendering possible the operation of a permanent magnet motor, the hysteresis motor is not capable of operating. On the other hand, if there is available, especially in the case of smaller motors, two windings, through one of which there can flow a current which, related to the current flowing through the other winding, is phase-shifted, it is theoretically possible to produce a relatively uniform rotary field. However, for this purpose, the effect of both windings must be combined at one identical axial section of the rotor compartment or chamber, leading to considerable constructional difficulties and thereby annihilating the aforementioned constructional advantages of the stator of the claw or dog pole type. In the case of small permanent magnet motors it is usually preferred to have avilable two axial adjacently arranged stator arrangements, in that a rotor is equipped with a permanent magnet which extends centrally into both stators. Then each of the stators delivers a simple alternating field, of which one is merely phase-shifted in time with respect to the other. The rotor is then driven by one stator at one moment in time and by the other stator during another moment in time, and the field which is obtained, while indeed in the nature of a certain type of rotary field, however is more correctly describable as "wobbling". Usually one of the stators is directly powered with single-phase alternating-current from the power supply network, whereas the other stator is supplied from such power supply network by a capacitor connected in series therewith. Depending upon whether there is supplied the one or the other winding by means of the capacitor, the rotor rotates in the one or the other direction. Yet, it will be observed however that such type "wobbling" rotary field in the case of a hysteresis motor does not afford any advantages in contrast to a simple alternating field.

If it is desired to obtain for a small motor the particularly interesting properties of a hysteresis motor, then it is necessary to provide a relatively complicated construction of the stator, and if it is desired to maintain a simple stator construction, then, there must be used a permanent magnet motor and there must be dispensed with the properties of the hysteresis motor.

SUMMARY OF THE INVENTION

Hence, it is a primary object of the present invention to provide a new and improved construction of a drive device which does not exhibit the above-mentioned drawbacks, and which also renders possible obtaining the favorable properties or characteristics of a small hysteresis motor while maintaining the simple stator construction of a small permanent magnet motor.

Now in order to achieve these objectives, and others which will become more readily apparent as the description proceeds, the electrical drive device of the above-defined type is manifested by the features that it comprises a permanent magnet rotor which is arranged in the aforementioned rotor compartment and rotates in synchronism with such magnetic field, and a magnetic hysteresis coupling, the driving part of which is form-lockingly connected with such rotor and the driven part of which is force-lockingly or frictionally connected with a shaft constituting the power take-off shaft of the drive device. The stator arrangement, the rotor, the driving part of such magnetic hysteresis coupling and the driven part of such coupling, are all contained internally of a common housing.

Advantageously, the body member composed of such rotor and the driving part of the coupling is freely rotatably seated upon the power take-off shaft.

It is particularly advantageous if such permanent magnet rotor comprises a first magnetic material or substance possessing relatively weak permanent magnetization (induction) but high coercive force, whereas such magnetic hysteresis coupling comprises a second material having relatively strong permanent magnetization (induction) and a coercive force below that of the first magnetic material.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
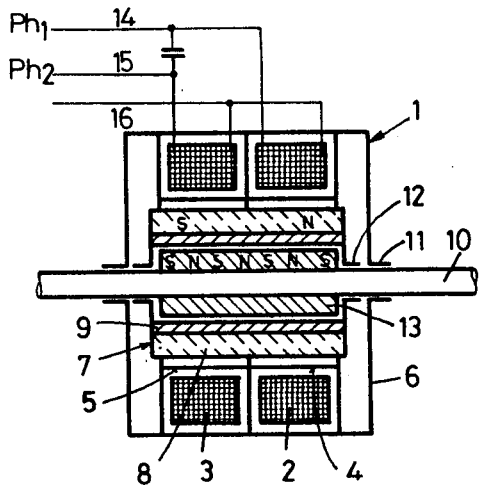
FIG. 1 is a simplified sectional view of a first embodiment of a drive device constructed according to the teachings of the present invention.

Describing now the drawings, in FIG. 1 there will be recognized a small motor 1 of the general type of a small alternating-current motor having two stator windings. The stator arrangement of such motor comprises a first stator winding 2 and a second stator winding 3, each of which act upon alternating stator poles 4 and 5, respectively, which have only been schematically shown in the drawing since such are of conventional type, the claw pole type (the iron circuit composed of the outer housing of the motor, the side plates which extend to each side of the stator windings and the pole pieces which alternately extend from one and the other side plate below the windings, wherein the magnetic flux closes by means of an air gap which absorbs the major part of the magnetomotive force, so that the poles alternately possess a magnetic polarity N and a magnetic polarity S). The motor comprises an outer casing or shell 6 which is equipped with bearings 11 in which there is rotatably mounted a shaft 10. A cylindrical, tubular-shaped body 7, which is mounted at location 12 upon the shaft 10, comprises two co-axial and force-locking interconnected sleeve-shaped parts 8 and 9. The sleeve-shaped part 8 constitutes a permanent magnet rotor which in accordance with the stator poles carries north and south poles. If the stator windings 2 and 3 have flowing therethrough mutually phase-shifted alternating currents, then the rotor part 8 is placed into rotation in a manner conventional for small permanent magnet motors. The supply of the stator occurs between a null conductor or line 16 and, depending upon the desired direction of rotation of the motor, the one or the other of both lines or conductors 14 and 15 which carry the phase of the power supply network. If the network voltage is connected between the lines 14 and 16, then it will be apparent that there is applied to the winding 2 the direct network voltage, whereas the winding 3 receives the network voltage by means of the capacitor 17 and the rotor rotates in one direction. If the voltage is connected between the line or conductor 16 and the line or conductor 15, then the winding 2 is supplied by means of the capacitor 17, whereas the winding 3 is directly supplied. The rotor now rotates in the other direction.

The sleeve-shaped part 9 which is force-lockingly connected with the rotor 8 also rotates. This sleeve-shaped part or component 9, is fabricated from an hysteresis material, i.e. a magnetic material having a high remanence, a low coercive force and a very high specific resistance. Additionally, a cylindrical part or component 13 is force-lockingly connected with the shaft 10 and is alternately provided with permanent magnet north and south poles. These poles, which flushly merge with the peripheral surface of the cylindrical part 13, allow a magnetic flux to reach the part 9 formed of hysteresis material, so that there is produced a magnetic coupling action between such hysteresis material-part 9 and the cylindrical part 13. If due to the action of the stator upon the rotor part or component 8 the tubular-shaped body 7 rotates, then this magnetic coupling transmits the rotational motion to the shaft 10 which then rotates in the same direction and with the same rotational speed as the tubular-shaped body or sleeve part 9 and the rotor sleeve 8. However, if the maximum moment or torque which the windings can impart to the rotor part 8, under these conditions is a braking torque which acts upon the shaft 10, and has reached the value of the maximum torque or moment, which the magnetic coupling 9, 13 can transmit, then the shaft 10 is rotated more slowly and even can be brought to standstill, whereas the tubular-shaped body 7 continues to rotate at the synchronous rotational speed. Hence, the shaft 10, constituting the power take-off shaft of the drive device, delivers a rotational moment which corresponds to the characteristic line "torque/rotational speed" of the hysteresis motor. Nonetheless, the entire stator arrangement retains the simple construction which is favorable for manufacture of a stator of the small permanent magnetic motor.

Figure 2:
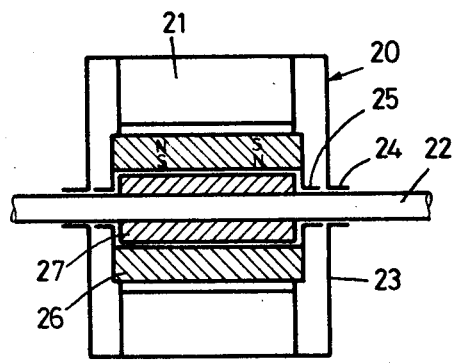
FIG. 2 is a simplified sectional view illustrating a further embodiment of such drive device.

The motor 20 of the modified embodiment of FIG. 2 is constructed analagous to the motor 1 of the arrangement of FIG. 1. It encompasses a stator arrangement 21, which can be the same as that of the motor 1, and therefore has not been particularly shown in FIG. 2 to simplify the illustration. This motor 20 likewise encompasses a power take-off shaft 22 which is mounted at location 24 in an outer casing or shell 23. Loosely secured to, and carried by the power take-off shaft 22, is a tubular-shaped part or component (or a tubular-shaped body) 26. A cylindrical part 27, which is arranged co-axially internally of the tubular-shaped body 26 is fixedly secured to the shaft 22. A ring-shaped air gap is present between the tubular-shaped body 22 and the cylindrical part 27.

The peripheral portion of the tubular-shaped body 27 consists of a permanent magnetic rotor of conventional construction, exactly as the peripheral portion of the tubular-shaped body 7 of the arrangement of FIG. 1. However, with the embodiment of FIG. 2 the roles of the sleeve-shaped part 9 and the cylindrical part 13 of FIG. 1 are reversed. This means that the tubular-shaped body 26 likewise possesses permanent magnet poles which flushly intersect with its cylindrical inner surface, and such body 26 completely consists of a permanently magnetized magnetic material, and that the cylindrical part 27 consists of a magnetic material possessing hysteresis. The mode of operation of the motor 20 of FIG. 2 is just like that of the motor 1 of the arrangement of FIG. 1, however its construction can be simplified. The permanent magnet poles, which flushly merge with the cylindrical inner surface of the revolving, tubular-shaped body 26, can consist of the ends of dipoles which extend through the entire thickness of the tubular-shaped body 26 and which form permanent magnetic rotor poles at the cylindrical outer surface of such body, which render possible placing into rotation the tubular-shaped body (or rotor) 26. The motor 20 of the arrangement of FIG. 2 thus has a still simpler construction than the motor 1 (or stated more exactly the drive device) of the showing of FIG. 1.

Figures 3, 3A:
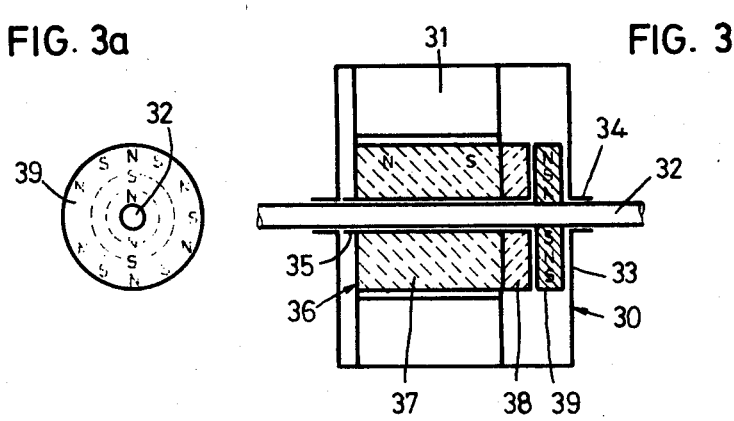
FIG. 3 is a simplified sectional view illustrating still a further embodiment of drive device constructed according to the teachings of the present invention.
FIG. 3a is a simplified front view of a circular part equipped with permanent magnet poles and used in the embodiment of FIG. 3.

The motor (or drive device) 30 shown in FIGS. 3 and 3a works according to the same principle as the motors of FIGS. 1 and 2. This motor 30 likewise comprises a stator arrangement 31 which can be constructed analagous to the stator arrangement 21 of FIG. 2 and the stator arrangement 2, 3, 4, 5 of the embodiment of FIG. 1. Of course, it can also be like that of another type which is usually employed for small permanent magnet motors, such as for instance the type with asymmetrical poles which by means of a simple alternating field ensure that the rotor always runs in the same direction, or the type equipped with copper delay rings which directly bring about a phase-shift of the magnetic field of certain stator poles. The drive device 30 encompasses a casing or shell 33 in which there is mounted at location 34 the power take-off shaft. With this embodiment, it is however possible for the body or body member 36, composed of a permanent magnet rotor 37 and a round part or component 38 formed of a hysteresis material, to be directly secured to the shaft 32 as shown at location 35, which shaft 32 extends simply through a central bore of the body 36 (the tubular-shaped body 7 of FIG. 1 and the tubular-shaped body 26 of FIG. 2 had to be provided with pivotable side plates in order to be rotatably mounted upon the shaft 10 and 22 respectively).

FIGS. 3 and 3a clearly show that the rotor part 37, composed of a permanent magnet material, carries rotor poles upon which act the stator excitation arrangement, whereas the round disk-shaped part 38, which is fabricated of a hysteresis material, is form-lockingly connected with the rotor part or component 37 and constitutes the driving part of a hysteresis coupling 38, 39. Furthermore, the round part or component 39 equipped with the axially directed permanent magnet poles (FIG. 3a) is force-lockingly connected with the shaft 32. The magnetic lines of these poles, which form the end surface of the part 39 located opposite the part 38 formed of hysteresis material, induce a magnetic flux in the hysteresis material in order to ensure for the transmission of the characteristic torque of this hysteresis coupling. There are of course provided in the simplified showing of FIG. 3 non-illustrated devices in order to prevent that the round, magnetized part 39 will shift under the action of the magnetic attraction axially in the direction of the part 38 formed of hysteresis material.

The construction of the drive device 30 of FIG. 3 has been found to be particularly simple, even if the relationship between the volume of the magnetic coupling and the volume of the actual rotor of this third exemplary embodiment is not as balanced as with the first two embodiments.

Figure 4:
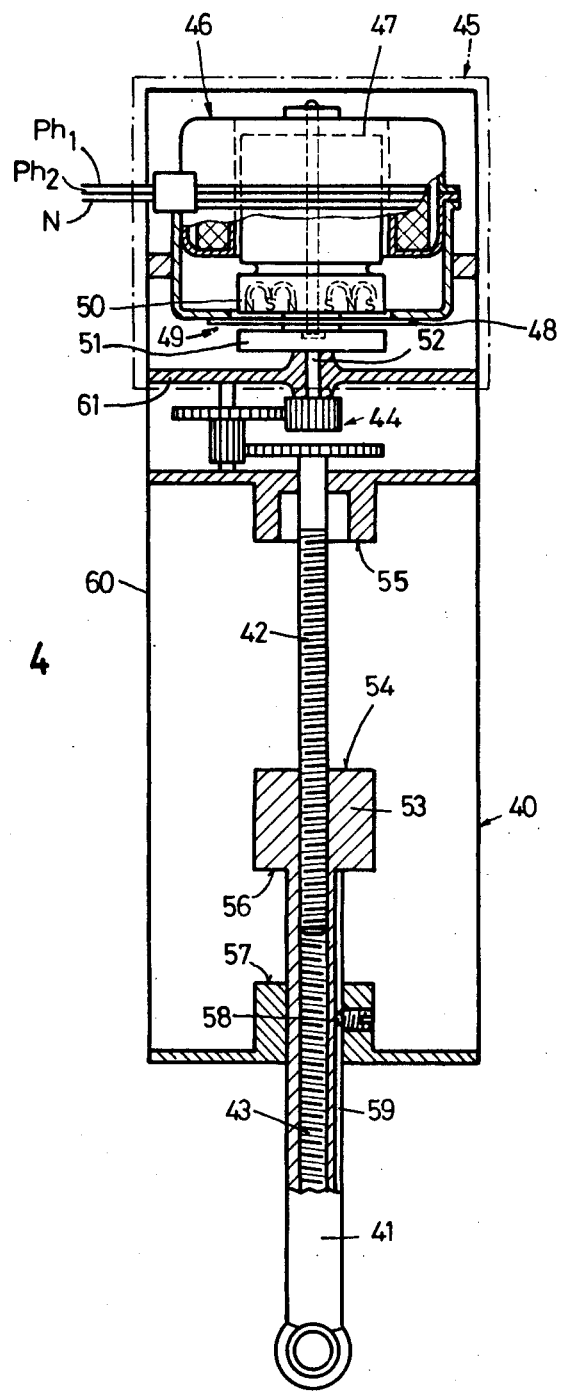
FIG. 4 portrays in sectional view a particularly interesting field of application of drive device of the invention.

FIG. 4 illustrates an application of a drive device of the type under discussion, such as for instance a drive device analagous to that shown in FIG. 3. In particular, FIG. 4 shows an actuator 40 encompassing an elevationally displaceable arm 41 which can be moved between two end or terminal positions, namely an ejected postion and a retracted position. To this end the device accommodated in a tubular casing or shell 60 comprises a drive device which corresponds to the elements surrounded by the chain-dot lines 45 enclosing a frame and which this time is composed of a small permanent magnet-motor-device 46, of the claw or dog pole type, and with a permanent magnet rotor 47, with which is form-lockingly connected the driving part or component 50 of a magnetic hysteresis coupling 49. This coupling 49 is effective through a non-magnetic and electrically non-conducting thin wall 48 forming a bearing for the rotor 47 and also serving as a spacer disk between the driving and driven parts of the coupling. The driven part 51 of this coupling 49 actuates a power take-off shaft 52 which is mounted in a flange 61 which closes-off the motor device 45. By means of step-down gearing 44 this power take-off shaft 52 rotates a threaded spindle 42 which is threaded into a threaded bore 43 provided at the central region of the elevationally displaceable arm 41. This arm 41, which extends through a end bore of the shell or casing of the device, is prevented from rotating by means of a pin 58 which is seated in a longitudinal groove at the periphery of the arm 41. It should be readily apparent that rotation of the threaded spindle 42 by the drive device 45 either advances or retracts the elevationally displaceable arm 41, depending upon the direction of rotation. This rotational sense is selected in that there is applied an alternating-current voltage either between the points N and Ph$_1$ of the infeed connections of the motor 46 or between the points N and Ph$_2$ of such infeed connections, as described previously in conjunction with the showing of FIG. 1.

What is interesting for the device of FIG. 4 is the fact that the elevationally displaceable arm 41 does not actuate any terminal switch, in order to come to standstill in one of its two end positions, rather is provided for this purpose with an impact or stop head 53 having the surfaces 54 and 56 which come to bear against two stop or impact members 55 and 57 which fix the end or terminal positions of the elevationally displaceable arm 41. If the drive device 45 is continously supplied with electrical power and the shaft 52 rotates in the one or the other direction, then the elevationally displaceable arm 41 is shifted in the lengthwise direction until one of the surfaces 54 and 56 strikes against a stop 55 and 57 respectively. Now the threaded spindle 42 no longer can rotate, since its movement is stopped in relation to the arm 41. This causes the transmission of an extremely high moment of resistance to the power take-off shaft 52 of the drive device 45. This resistance moment exceeds the characteristic moment of the magnetic hysteresis coupling 49, which begins to slip, in order to render possible stopping of the power take-off shaft 52. During this time the rotor 47 of the motor 46 continues to rotate and thus drives the driving part 50 of the hysteresis coupling 49, since the electrical supply is not interrupted. This situation can last for a random period of time without causing any disturbance. It should be clear that in accordance with the stroke it is also possible to interrupt the current supply of the motor 46. If it is desired to bring about a movement of the elevationally displaceable arm 41 in the other direction, then the electrical supply connections are altered in such a manner, as described above, and the rotor begins to rotate in the other direction and thus also drives the power take-off shaft 52 in the other direction. The hysteresis coupling stops slipping; the threaded spindle rotates until the stop head 53 has been brought to standstill in the other end or terminal position of the elevationally displaceable arm 41. At this moment in time the resistance moment begins to again exceed the moment which can be transmitted by the magnetic coupling, so that the power take-off shaft 52 together with the step-down gearing 44 and the spindle 42 remain stationary. Again the electrical supply can be retained for a random long period of time without any drawback, so that the rotor 47 and the driving part 50 of the magnetic coupling rotate further without causing any kind of disturbance.

Moreover, it has been found that the drive device of the type under discussion and especially that having a construction as in FIG. 1, possess quite special advantages or characteristics, provided that the magnetic material, from which the rotor part 8 and the cylindrical part 13 of the magnetic coupling is formed, are properly selected. It has been namely found that also then when the stator windings are structured and controlled such that there is induced a uniform rotary field through the stator poles 4 and 5, the drive device under discussion is clearly more advantageous than a hysteresis motor which only encompasses a single rotor without magnetic coupling and which rotor is fabricated of a material possessing magnetic hysteresis.

In order to understand such, it should be conceived that, on the one hand, the hysteresis devices (motor or coupling) must possess a relatively high induction in their air gap, whereas the question of the coercive force (only for the coupling, since the hysteresis motor itself contains no permanent magnets) plays practically no role, whereas, on the other hand, the permanent magnet-devices (motor or coupling) must contain permanent magnets which especially possess a high coercive force, resulting in a relatively low residual induction, if there is not employed a material formed on the basis of platinum which simultaneously has a high coercive force and a high residual induction, but is much too expensive. There is used for the permanent magnets of the premanent magnet-drive devices or coupling devices usually ferrite, such as for instance BaO 6Fe$_2$O$_3$, the magnetization characteristic of which has been illustrated by the curve I of FIG. 5. However, such motors or couplings, notwithstanding the low induction which then is present in the air gap, are capable of delivering a relatively high mechanical torque, something which is especially attributable to the fact that with such devices there is not only employed the attraction between two opposite magnetic poles but also the repulsion between two similar type magnetic poles. This low induction moreover in the case of small permanent magnet-synchronous motors and also in the case of the drive devices under discussion has an advantage insofar as the iron circuit of the stator, due to the low magnetic flux which is produced from its low induction, can possess a relatively small cross-sectional area. When, and this is usually the case, the iron circuit of the stator is fabricated of a ferromagnetic material having high permeability, then the stator can possess a much smaller cross-section than the total cross-section of the air gap, rendering possible the easy and small construction of the stator. If it is desired to replace the drive device of the permanent magnet type, combined with hysteresis-coupling device, by a simple drive device of the type hysteresis motor without coupling device, then the air gap between the stator and the rotor must be subjected to a less pronounced magnetic induction, which would mean that the iron circuit of the stator must have an appreciably more pronounced cross-section.

Figure 5:
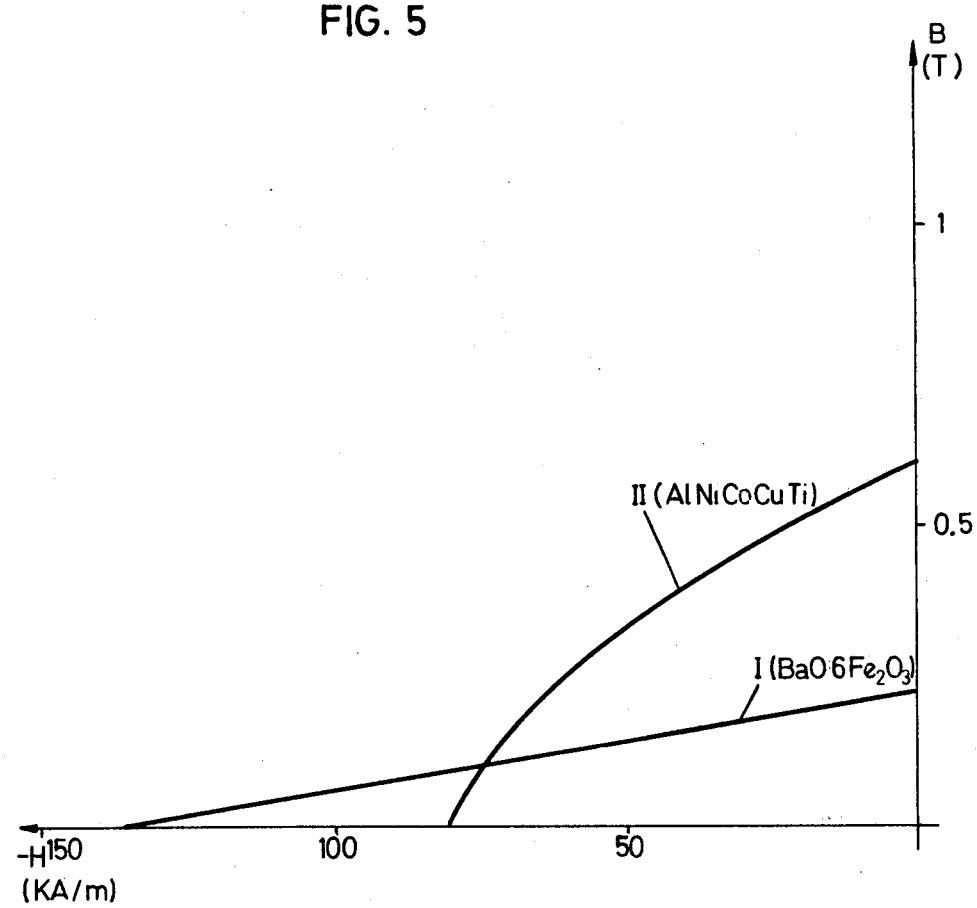
FIG. 5 is a diagram illustrating the magnetization curves of a permanently magnetized magnetic material of the rotor as well as a permanently magnetized magnetic material of the hysteresis coupling.

With the device of the particular type here under discussion, for instance of the type illustrated in FIG. 1, the induction in the air gap of the coupling device can be maintained high in that for producing the part carrying the permanent magnet poles of the coupling device, i.e. the part 13 in the case of the embodiment of FIG. 1, there is used a magnetic material having high residual magnetization and there is not taken into account its coercive force, there being used for instance the alloy AlNiCoCuTi, the magnetization characteristic of which has been illustrated in FIG. 5 by the curve II. Since this magnetic induction closes by means of a very short iron circuit composed of the hysteresis material, i.e. the sleeve 9 in the case of the embodiment of FIG. 1, no phenomenon of high magnetic redundance hinders the formation of a pronounced induction in the air gap of the coupling device. On the other hand, there is ensured—still with the particular drive device under discussion—due to the permanent magnet-drive part for the previously mentioned reasons, a considerable moment notwithstanding the relatively weak induction in the air gap of the motor part. Due to these theoretical considerations and by virtue of practical tests which have been carried out, it has been found that with a comparison between an actual hysteresis motor (wherein there has been assumed that the field produced by the stator windings is a uniform rotary field) and a drive device of the type under discussion the latter is more advantageous. This is so because in order to obtain equal output in the power torque, the actual hysteresis motor must possess a voluminous stator iron circuit, causing such to be heavy and its dimensions becoming enlarged. If, on the other hand, this hysteresis motor of conventional type is to be built with the same dimensions as the drive device of the described special construction or type, i.e. with a stator iron circuit of low cross-section, then the induction in the air gap would be smaller due to the high magnetic redundance which such stator iron circuit would exhibit. With the same dimensions the outputs in the torque, and thus the drive output, assuming the rotational speed to be the same, would be appreciably less good.

Hence, the latter possesses an appreciable advantage, apart from the fact that the drive device of the type under discussion also can work to a certain degree with a very incomplete rotary field (containing a pronounced oscillating component), even under the assumption, under which the stator windings produce a perfect rotary field, which render possible the functioning of a hysteresis motor of conventional type. A feature which is important for obtaining such output resides in the difference of the magnetization curves of the permanent magnet materials, from which on the one hand there are formed the permanent poles for the drive part (FIG. 1, Part 8) and, on the other hand, the permanent poles for the coupling part (FIG. 1, Part 13). Typically, both of these magnetic materials are those whose magnetization characteristic or characteristic lines have been illustrated in FIG. 5. This particular technical measure can also be of course employed in the case of the motor according to the showing of FIG. 3. In principle, it can also be used for an embodiment which is similar to that of FIG. 2, however the tubular-shaped part 26 must then consist of two parts fabricated of both of the different materials, and the magnetization of such part could present certain difficulties.

It should however be clear that the special construction of drive device as taught herein, due to its external property of the hysteresis motor in contrast to the conventional permanent magnet-synchronous motor, still further possesses an additional advantage. This is in terms of the fact that its start-up is completely independent of the inertia which loads its power take-off shaft, since the intermediate rotor can start-up at a lower inertia immediately at the synchronous rotational speed and then is progressively driven up to the synchronous rotational speed under the conditions of the power take-off shaft which are fixed by its inertia. Thus it is possible with the aid of the drive device as shown in FIG. 1 to start-up an extremely heavy turntable of a record player, which then, following a certain acceleration time, revolves at the synchronous rotational speed. A smaller permanent magnet-synchronous motor of conventional construction will not run under these conditions.

The particular inventive conception thus affords two appreciable advantages, the first of which resides in the fact that the additional characteristic of a small hysteresis motor can be combined with the very simple possibility of the construction which is afforded by small permanent magnet motors, whereas a further advantage is present in terms of the fact that the output of the motor can be improved in relation to a hysteresis motor, and specifically also then when the field induced by the stator windings is a correct rotary field, which is suitable for a hysteresis motor.

According to a practically constructed embodiment, a motor of the type shown in the arrangement of FIG. 1, which was formed of magnetic materials corresponding to that of FIG. 5, possessesed a moment of about 50 g cm or about 0.5 Newton cm with an external diameter of 35 mm and a thickness of 24 mm, and the intermediate rotor and the rotor connected force-lockingly with the power take-off shaft possess diameters of 14 mm and 9 mm respectively.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. An electrical drive device comprising:
   means defining a rotor compartment;
   a stator arrangement of the claw pole type and surrounding said rotor compartment and producing therein at least one magnetic field which contains at least one rotary field component;
   a permanent magnet rotor arranged in said rotor compartment such that it rotates in synchronism with said magnetic field;
   a hysteresis magnetic coupling having a driving part and a driven part;
   said driving part being connected in form-locking manner with said rotor;
   a shaft;
   said driven part being connected in force-locking manner to said shaft;
   said shaft constituting a power take-off shaft of the drive device; and
   said means defining the rotor compartment including a common housing in which there is arranged the stator arrangement, the rotor, the driving part of the hysteresis magnetic coupling and the driven part of said coupling.

2. The drive device as defined in claim 1, wherein:
   said rotor and said driving part of the coupling define a body which is freely secured for rotation to said power take-off shaft.

3. The drive device as defined in claim 2, wherein:
   the rotor and the driving part of the coupling define said body which possesses the shape of a substantially cylindrical tube and composed of two parts in the form of concentric sleeves which engage in a force-locking manner with one another;
   one of said sleeves defining an outer part formed of magnetic material possessing permanent magnetization;
   the rotor having permanent magnet poles which are spatially fixed within said outer part;
   the other sleeve defining an inner part formed of magnetic hysteresis material in order to form the driving part of said coupling;
   the driven part of said coupling comprising a substantially cylindrical part secured to the power take-off shaft and concentrically arranged in said body;
   the concentric driven cylindrical part supporting at its outer surface permanent magnet poles, said outer surface neighboring at an inner surface of the inner, sleeve-shaped part without contacting the same, so that such permanent magnetic poles induce a magnetic flux by means of an air gap in the hysteresis material forming this part.

4. The drive device as defined in claim 2, wherein:

the rotor and the driving part of the coupling define said body which is in the form of a substantially cylindrical tube and comprises a substantially sleeve-shaped part formed of a magnetic material with permanent magnetization;

rotor-permanent magnetic poles spatially fixed in such sleeve-shaped part in such a manner that they flushly bear at a cylindrical outer surface thereof;

permanent magnetic poles spatially fixed in such sleeve-shaped part in a manner such that they flushly bear at an inner cylindrical surface thereof;

that portion of the sleeve-shaped part which is located near its inner cylindrical surface constituting the driving part of such coupling;

the driven part of said coupling comprising a substantially cylindrical part arranged concentrically in such body and secured to said power take-off shaft;

said cylindrical part being formed of a magnetic hysteresis material and having an outer cylindrical surface which bounds at the inner cylindrical surface of said sleeve-shaped part without contacting the same, so that the permanent magnetic poles, which flushly bear at the inner cylindrical surface of the sleeve-shaped part, induce a magnetic flux through an air gap in the hysteresis material forming such cylindrical part.

5. The drive device as defined in claim 4, wherein:

said rotor-permanent magnetic poles and said permanent magnetic poles are arranged in the same manner and are formed by the relevant ends of magnetic dipoles which are spatially fixed throughout the entire thickness of the sleeve-shaped part.

6. The drive device as defined in claim 1, wherein:

the rotor and the driving part of the coupling define a body member of substantially cylindrical shape and comprise a permanent magnet-rotor part which occupies said rotor compartment, and a first, substantially round part secured in force-locking manner to the rotor part at an axial end thereof;

said round part having essentially the same diameter as the rotor part and being formed of a magnetic hysteresis material in order to form the driving part of said coupling;

the driven part of the coupling comprising a second, substantially round part which is attached concentrically with respect to said body member and opposite an end surface of the first substantially round part to said power take-off shaft;

said second round part carrying at its end surface permanent magnet poles and at which end surface there neighbors the end surface of the first round part, without contact between said two end surfaces, so that such permanent magnet poles induce a magnetic flux through an air gap in the hysteresis material from which there is formed this first round part.

7. The drive device as defined in claim 1, wherein:

the permanent magnet rotor comprises a first, permanently magnetized magnetic material having a high coercive force and a relatively low residual magnetization;

the hysteresis magnetic coupling comprising a second, permanently magnetized magnetic material having a high residual magnetization and a coercive force which is less than that of the first magnetic material.

8. The drive device as defined in claim 7, wherein:

the first permanently magnetized magnetic material possesses a coercive force of more than 120 KA/m; and the second permanently magnetized, magnetic material possesses a residual magnetization greater than 0.5 T and a coercive force less than 100 KA/m.

9. The drive device as defined in claim 8, wherein:

said first permanently magnetized, magnetic material is $BaO\ 6Fe_2O_3$ and the second permanently magnetized magnetic material is AlNiCoCuTi.

* * * * *